US008871157B2

(12) United States Patent
Homberg et al.

(10) Patent No.: US 8,871,157 B2

(45) Date of Patent: Oct. 28, 2014

(54) ELECTRONIC PIPETTE WITH TWO-AXIS CONTROLLER

(75) Inventors: William D. Homberg, Oakland, CA (US); Michael C. Schmittdiel, Oakland, CA (US); Haakon T. Magnussen, Orinda, CA (US); Andrew Vainshtein, Palo Alto, CA (US); Thomas Allen Bell, Oakland, CA (US); Vintory L. Blake Moore, Atlantic Beach, NC (US)

(73) Assignee: Rainin Instrument, LLC, Oakland, CA (US)

( * ) Notice: Subject to any disclaimer, the term of this patent is extended or adjusted under 35 U.S.C. 154(b) by 428 days.

(21) Appl. No.: 13/109,759

(22) Filed: May 17, 2011

(65) Prior Publication Data

US 2012/0291567 A1 Nov. 22, 2012

(51) Int. Cl.

| | |
|---|---|
| ***B01L 3/00*** | (2006.01) |
| ***B01L 3/02*** | (2006.01) |
| ***G01N 1/14*** | (2006.01) |
| *G01F 25/00* | (2006.01) |

(52) U.S. Cl.

CPC ......... *B01L 3/0237* (2013.01); *B01L 2300/027* (2013.01)

USPC .......... 422/515; 422/508; 73/1.74; 73/864.13

(58) Field of Classification Search

CPC ............................. B01L 3/0237; B01L 2/0234

USPC .................................... 422/515, 518; 73/1.74

See application file for complete search history.

(56) References Cited

U.S. PATENT DOCUMENTS

2005/0118069 A1* 6/2005 Solotareff et al. ............ 422/100
2008/0011042 A1* 1/2008 Molitor et al. ................. 73/1.74
2009/0071266 A1* 3/2009 Nelson et al. .............. 73/864.13
2009/0074622 A1* 3/2009 Kalamakis et al. ........... 422/100

* cited by examiner

*Primary Examiner* — Jill Warden
*Assistant Examiner* — Brittany Fisher
(74) *Attorney, Agent, or Firm* — Clarke A. Wixon

(57) ABSTRACT

A handheld electronic pipette including several features aimed at improving ease of use, including a color dot matrix display, an intuitive thumb-operated two-axis controller, and multifunction soft buttons adjacent to the display. A simple and consistent user interface facilitates easy access to various modes of operation, including a manual pipetting mode and a remote mode.

28 Claims, 12 Drawing Sheets

ELECTRONIC PIPETTE WITH TWO-AXIS CONTROLLER

BACKGROUND OF THE INVENTION

Manually-operated handheld air displacement pipettes using interchangeable and disposable plastic tips have been available for more than forty years, and remain the dominant small-volume liquid handling tools in scientific and biomedical laboratories. They are generally lightweight, intuitive, simple to use, and reliable.

Although electronically operated handheld pipettes have been available for more than twenty-five years, they generally have not been as popular as manual pipettes. Electronic pipettes have not reached comparable levels of intuitive operation, ease of use, or ergonomics. Except in some specific applications, they are generally less favored for several reasons.

Electronic pipettes are generally larger and heavier than traditional manually operated pipettes. An electronic pipette needs space for a battery, a control circuit, and a drive motor in addition to the moving piston, which in a manual pipette is driven by a simple plunger button. Historically, electronic pipettes have been difficult to program and use, as low-power electronics and size and cost constraints have limited the user interface to a few buttons and a small, monochromatic, fixed-segment LCD display. And with immature battery technology, a relatively large and heavy battery needed to be used, and required fairly frequent recharging or replacement.

Because of their increased complexity, electronic pipettes are generally more expensive than their fully manual counterparts. They are less tactile to use, more complex, and as a consequence have greater potential unreliability.

On the other hand, electronic pipettes provide several key advantages over traditional manual pipettes: they offer multiple features and modes of operation that are either impossible or difficult to achieve with manual pipettes (such as multidispense modes, complex sequences of operations, and remote controlled operation). Because there is no spring-loaded plunger rod, the pipette is particularly ergonomic, with the user's hand subject to considerably reduced forces. And because of their electronic nature, electronic pipettes are capable of storing information about the pipetting operations that have been performed, are consistent from cycle to cycle, and are less reliant on user technique.

But in general, the advantages have not outweighed the disadvantages for many users. The ease of use of a manual pipette has been a difficult advantage for electronic pipettes to overcome.

Accordingly, there is a continuing need for an electronic pipette that is not only flexible and powerful, but is simple enough in operation to compete with traditional manually operated pipettes.

SUMMARY OF THE INVENTION

An electronically operated pipette according to the invention addresses some of the shortcomings of presently available handheld pipettes, while retaining the key advantages electronic pipettes generally hold over manual pipettes.

An electronic pipette according to the invention is lightweight, reliable, and easy to use. It employs a large, bright, color dot-matrix display, a plurality of multifunction control buttons, and a two-axis controller to improve the user experience. The controller may be manipulated from side to side or vertically to control various aspects of the pipette's operation, and may be depressed to register a selection. The two-axis controller and multifunction control buttons are placed for convenient and comfortable manipulation while hand-holding and operating the pipette. The large color display facilitates greater graphical and informational feedback to the user, and enables more informative status, warning, and error screens to be presented.

In an embodiment of the invention, the electronic pipette is provided with a micro-USB socket for both charging and for remote-control and accessory hosting functions. A MicroSD memory expansion slot may be provided to receive a memory card, for purposes of updating the firmware of the pipette, making available storage for data logs relating to the operation of the pipette, or providing data or parameters for controlling or operating the pipette in either the default modes provided by the firmware or additional modes enabled by instructions stored on the memory card.

In an embodiment of the invention, the electronic pipette includes an RFID tag (either read-only or writable) to facilitate pipette tracking, management, and compliance with service and calibration protocols.

As described herein, the invention is particularly applicable to air-displacement electronic pipettes, though it should be noted that the structures and functions described herein are also applicable to positive-displacement pipettes and other handheld material handling devices.

BRIEF DESCRIPTION OF THE DRAWINGS

These and other objects, features, and advantages of the invention will become apparent from the detailed description below and the accompanying drawings, in which.

DETAILED DESCRIPTION OF THE INVENTION

The invention is described below, with reference to detailed illustrative embodiments. It will be apparent that a system according to the invention may be embodied in a wide variety of forms. Consequently, the specific structural and functional details disclosed herein are representative and do not limit the scope of the invention.

Figure 1:
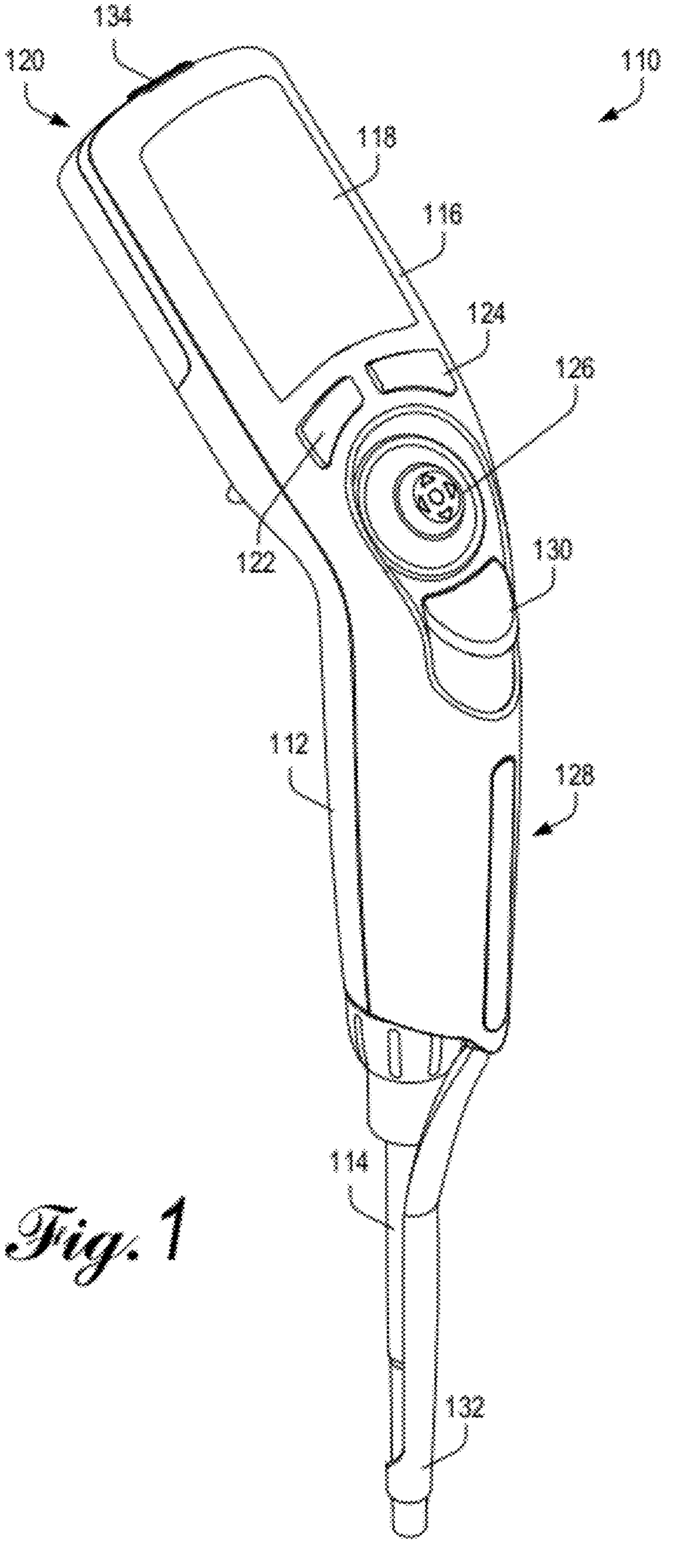
FIG. 1 is an external isometric view of an exemplary electronic pipette according to the invention.

Referring initially to FIG. 1, an overview illustration of a handheld electronic pipette 110 according to the invention is presented.

Like most traditional handheld manual and electronic pipettes, the illustrated pipette 110 has a generally elongated configuration with a vertically extending longitudinal axis. The pipette 110 includes a hollow vertical hand-holdable housing 112 having a shaft 114 at its bottom end to receive disposable pipette tips.

An upper portion 116 of the housing 112 is angled back from the longitudinal axis, and includes a forward compartment containing a forwardly facing color dot-matrix liquid crystal display (LCD) 118 adjacent a top 120 of the housing 112. In the disclosed embodiment, the display 118 is angled back approximately 45 degrees from vertical. Thus located and configured, the display 118 is readily viewable by a user during all modes of operation of the pipette 110 be the user right handed or left handed. The display 118 is preferably a backlit LCD having sufficient resolution to permit and facilitate the graphical user interface described herein.

On the upper portion 116 of the housing 112, below the display 118, two control buttons (namely, a left button 122 and a right button 124) are located. The control buttons 122-124 are multifunctional, and the specific functions performed upon their actuation may vary depending on the operating mode of the pipette 110, as will be described in further detail below. The functions of the buttons 122-124 may be indicated by legends presented on an adjacent portion of the display 118.

Below the control buttons 122-124 is situated a two-axis joystick-style controller 126. As shown, the controller 126 is intended to be manipulated by the user's thumb. It may be rocked from side to side or vertically. In the disclosed embodiment, the controller 126 further acts as an additional control button when depressed. Preferably, the two-axis controller 126 is of an analog nature, capable of distinguishing not only the direction in which it is moved, but also the magnitude of any departure from a spring-biased center position. Accordingly, the controller 126 receives and measures a user input representative of a position along at least one axis, and as described herein, along two axes.

In the disclosed embodiment, as set forth above, the controller 126 is a two-axis joystick-style device, capable of outputting a substantially continuous (though quantized) range of output values representative of its horizontal and vertical position, and spring-biased to a center position. However, it should be noted that other controller implementations are possible. For example, a two-axis controller may be spring-biased to a home position other than the center, or may be spring-biased only along one axis (horizontal or vertical) and not the other. Or it may have no spring bias whatsoever. In an embodiment of the invention, a single-axis continuous controller (e.g. along a vertical axis) may be supplemented by additional navigational inputs, such as buttons, to represent movement along another axis.

Other controller configurations, beyond the continuous stick-style device described above, are also possible. For example, the controller 126 may take the form of a trackball controller, touch-sensitive pad, or pressure sensitive nub. Such two-axis controllers are well known in the realm of handheld devices, and can be found in (for example) mobile telephones and portable computers. These types of controllers are also cable of outputting substantially continuous position values along two axes, and accordingly, are suitable for use in connection with the invention described herein. When using a trackball, pad, or similar controller without a self-centering function, a logical "center" or "home" position may be defined as where the user first places his or her finger, i.e., the location where a movement or gesture using the controller originates.

Below the controller 126, at the top of a vertical handle portion 128 of the housing 112, is a tip ejector button 130. As in many traditional manual and electronic pipettes, the tip ejector button 130 is coupled through an ejector mechanism partially internal to the pipette 110 to a tip ejector sleeve 132, and when a tip is mounted on the shaft 114, depressing the tip ejector button 130 will cause the tip ejector sleeve 132 to act against the tip and urge it off the shaft 114.

At the top of the upper portion 116 of the housing 112 of the pipette 110, a USB socket 134, preferably a Micro-B-type socket, is available. The USB socket is adapted to receive a conventional and commonly available Type-A to Micro-B cable for communication between the pipette 110 and a computer workstation, or may receive a charger plug having a Micro-B configuration.

The shape and general configuration for the electronic pipette 110 described and illustrated herein has been found to be convenient and comfortable for a wide variety of users. However, it should be noted that numerous other physical configurations are possible and are deemed to be within the scope of the present invention.

Figure 2:
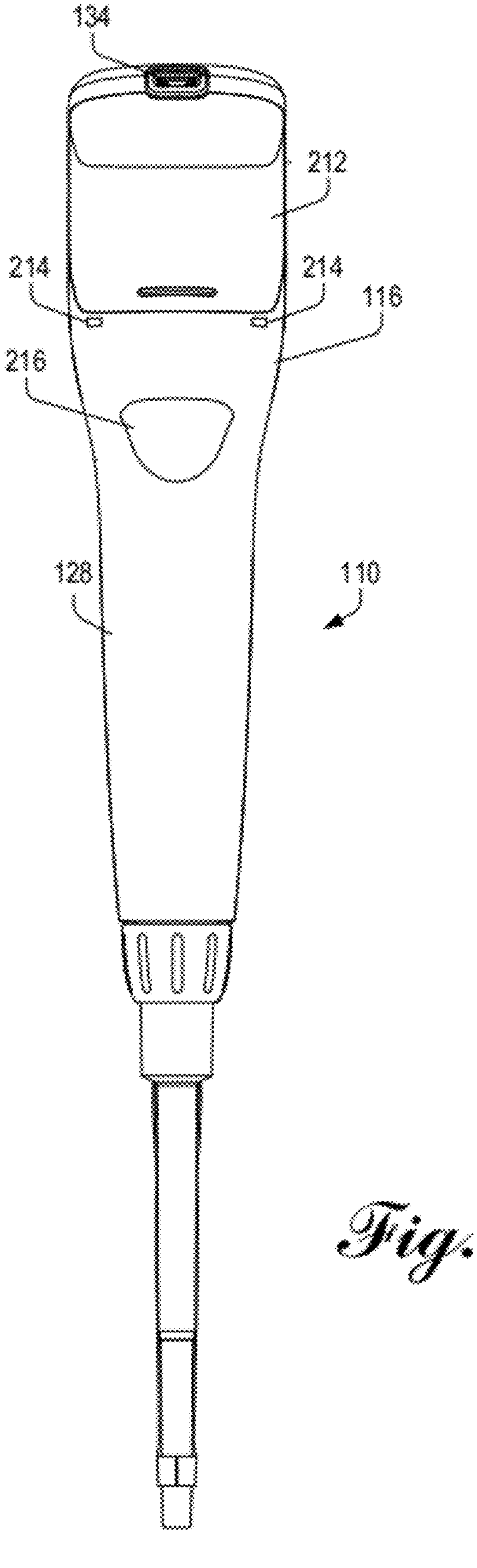
FIG. 2 is an external rear view of the electronic pipette of FIG. 1.

FIG. 2 presents a rear view of the pipette 110 of FIG. 1. The USB socket 134 is visible at the top of the upper portion 116 of the housing 112 of the pipette 110. Below the USB socket 134 is a slidable battery compartment cover 212, which may be removed to access a removable and rechargeable battery for the pipette 110, as well as a MicroSD memory card slot and a button cell battery used to run a real-time clock within the pipette 110. The rechargeable battery, memory card slot, and button cell battery will be described in further detail below.

Below the battery compartment cover 212, two exposed electrical contacts 214 allow the rechargeable battery to be charged by simply placing the pipette 110 onto a charge stand, such as the rapid charge stand illustrated in FIG. 5 and described below. The pipette 110 may be recharged either through the contacts 214 or the USB socket 134.

A finger hook 216 is located on a rear portion of the pipette 110, near a junction between the vertical handle portion 128 of the housing 112 and the upper portion 116 of the housing 112. The finger hook 216 is situated such that when a user is grasping and operating the pipette 110 normally, by grasping the handle portion 128 and wrapping his or her fingers around the housing 112, the finger hook 216 rests on the user's index or middle finger, and the user's thumb rests naturally on or near the controller 126 and buttons 122-124.

Figure 3:
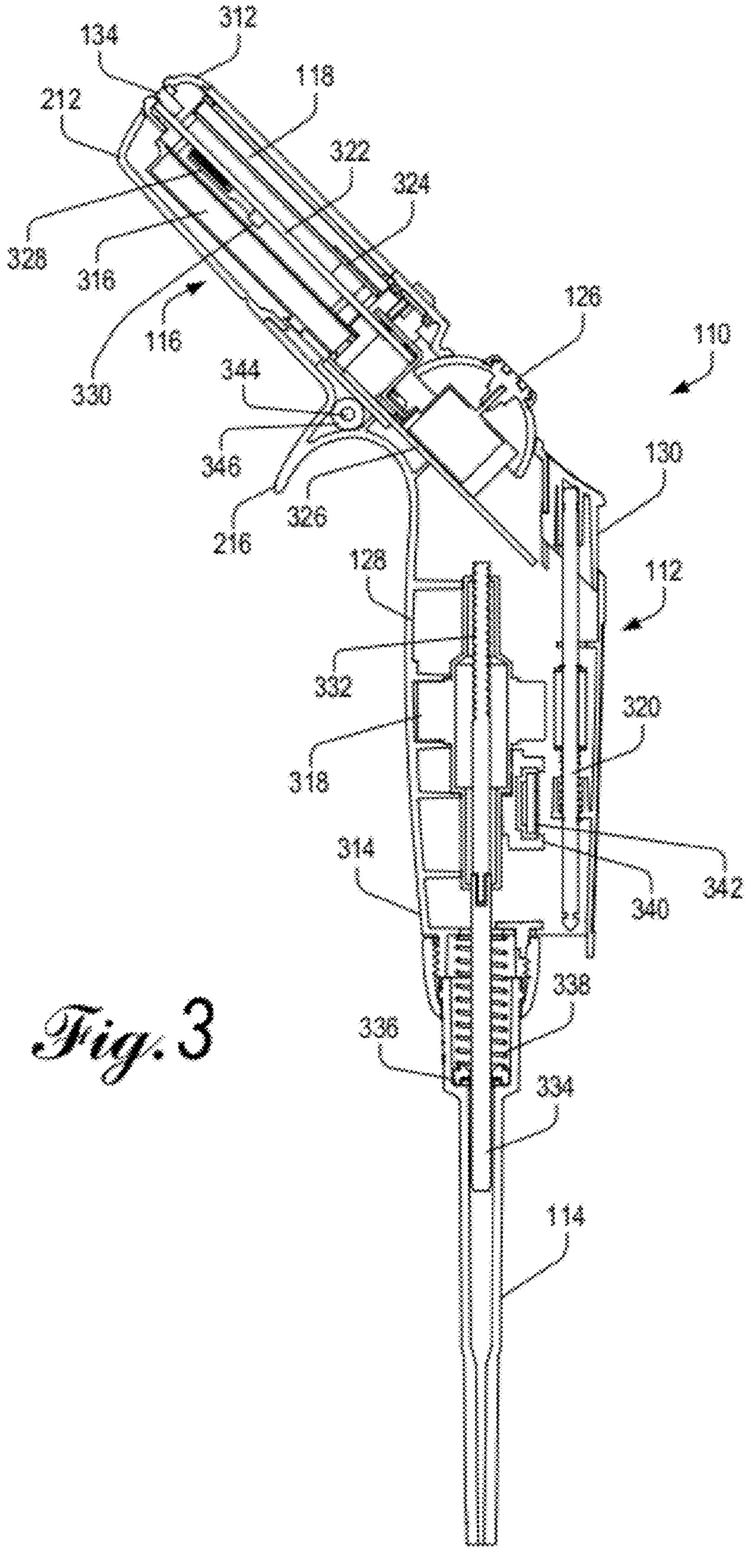
FIG. 3 is a cutaway view of the electronic pipette of FIG. 1, illustrating various primary internal functional components and subsystems.

As shown in FIG. 3, the housing 112 of the pipette 110 consists of two primary interlocking portions, a front housing segment 312 and a rear housing segment 314. Several additional internal frame pieces are used to position various components of the pipette 110 within the housing 112.

As noted above and in connection with FIG. 2, the upper portion 116 of the housing 112 includes a rear compartment which contains a rechargeable and replaceable battery 316 for powering a microprocessor and motor 318 contained within the housing 112. Preferably, the handle portion 128 of the front housing segment 312 internally contains an ejector mechanism, including the thumb actuated ejector button 130 coupled to a spring biased and vertically moveable ejector arm 320 that extends to a position near a lower extent of the housing 112. The ejector arm 320 couples to the ejector sleeve 132 (FIG. 1) that encircles the shaft 114 of the pipette 110 adjacent a lower end thereof. Thus configured, the pipette tip ejector is designed to eject a pipette tip from a lower end of the mounting shaft upon downward movement of the tip ejector arm. This general tip ejector configuration is described in detail in U.S. Pat. No. 5,614,153 to Homberg, issued on Mar. 25, 1997, which is hereby incorporated by reference as though set forth in full herein.

As described in connection with FIG. 2, the rear housing segment 314 has a finger hook 216 extending rearward from a position near an upper end of the handle portion 128. The finger hook 216 includes a downwardly curved lower surface for engaging an upper side of a user's index finger (or middle finger, if desired) while the user is gripping the handle, with the thumb of the user free to actuate any of the controls of the electronic pipette in any sequence desired.

Thus, the weight of the pipette 110 is borne primarily by the user's grip on the handle portion 128 of the housing 112 and the finger supporting the finger hook 216, and accordingly, the electronic pipette 110 of the present invention is useable over extended periods of time without unduly stressing the user's thumb, hand or forearm, enabling accurate and repeatable operation of the pipette in all operational modes of pipette under control of the user.

As noted above, the electronic pipette 110 described herein is a microprocessor-based apparatus. Accordingly, the pipette 110 includes a control circuit comprising several interconnected printed circuit boards including a microprocessor, memory, and various support components and functional components cooperative to drive and otherwise operate the pipette according to the programming of the microprocessor and the user's direction.

In the disclosed embodiment, a main circuit board 322 is positioned in the upper portion 116 of the housing 112 between the display 118 and the battery 316. The main board 322 is electrically coupled to a display board 324 (which in turn is connected to and drives the display 118) and a motor driver board 326. The main board includes the microprocessor and its support components, including a MicroSD memory card slot 328, an internal processor reset button 330, and a replaceable button cell battery that provides power to a real-time clock and, in an embodiment of the invention, non-volatile memory.

The motor driver board 326 includes the electronic circuitry necessary to generate signals used to drive the stepper motor 318. As in commercially available electronic pipettes, the motor 318 uses a lead screw 332 to convert the motor's rotary motion to a linear motion that drives a piston 334 vertically within the housing 112; the stepper motor 318 and lead screw 332 together form a linear actuator. The stepper motor 318 is driven using techniques and methods generally described in U.S. Pat. No. 4,671,123 to Magnussen et al. issued on Jun. 9, 1987 and U.S. Pat. No. 6,254,832 to Rainin et al., issued on Jul. 3, 2001, both of which are hereby incorporated by reference as though set forth in full herein.

When driven by the stepper motor 318 and lead screw 332, the piston 334 traverses vertically through a seal assembly 336 (which is maintained in position and compressed by a spring 338) within the shaft 114 of the pipette 110, thereby displacing air within the shaft 114 and a connected pipette tip. By this well understood mechanism, the pipette 110 functions as an air displacement device to meter and handle fluids.

The stepper motor 318 is held in place within the housing 112 via a motor bracket 340, which also holds an audio transducer 342. The motor 318 is provided with some compliance, to allow the piston to self-center within the seal assembly 336. The audio transducer 342 is driven by the microprocessor and support components to provide audio feedback to the user as the pipette 110 is operated, to facilitate navigation though the user interface, and to alert the user to status changes, warnings, or error conditions. In the disclosed embodiment, the audio transducer 342 comprises a piezoelectric speaker; an electromagnetic speaker may also be used.

The motor driver board 326 further carries the joystick-style controller 126, which in the disclosed embodiment is a combination of an analog two-axis potentiometer and a momentary switch. A horizontal position of the controller 126 is captured by a first variable resistor and converted into a digital representation by a first analog-to-digital converter. Similarly, a vertical position of the controller 126 is captured by a second variable resistor and converted into a digital representation by a second analog-to-digital converter. These horizontal and vertical digital representations, along with an indication of whether the controller 126 is depressed (received from the momentary switch) and the positions of the two control buttons 122-124 are all provided to the microprocessor.

Electronic circuitry in the pipette 110 further includes a battery charging subsystem adapted to provide the appropriate constant-current-constant-voltage (CCCV) charging signal to the lithium ion battery 316, and circuits to support the MicroSD memory card slot 328, the USB socket 134, the real-time clock, and various other features and functions of the pipette 110.

The microprocessor, in an embodiment of the invention, is a system-on-a-chip (SOC) implementation using an ARM-based processor architecture, which provides adequate computing power for the operation of the pipette 110, while consuming relatively little power. The SOC includes memory and various input/output interfaces without requiring substantial numbers of external components. When the pipette 110 is not in use, the microprocessor is programmed to enter a low-power sleep mode, prolonging the life of the rechargeable battery 316. The pipette 110 is programmed to ensure that sleep mode is not entered while pipetting operations are ongoing.

The microprocessor is programmed to perform pipetting operations in various modes, described in detail below. Precision and accuracy are maintained by applying various calibration and compensation factors, which may be stored in the microprocessor's memory. Calibration and compensation in electronic pipettes is described in U.S. Pat. No. 5,187,990 to Magnussen et al., issued on Feb. 23, 1993, which is hereby incorporated by reference as though set forth in full herein. The calibration and compensation factors stored in memory may be specific to the unit, and stored during an initial calibration process following manufacture (or a subsequent recalibration process), or may be generic to a particular model or configuration of the pipette 110.

The pipette 110 further includes a radio frequency identification (RFID) tag 344 housed within a shockproof enclosure 346. The RFID tag 344 is readable and writable with an RFID reader/writer positioned near the pipette 110, and may store serial number information, additional asset tracking information, and dates, times, and further data relating to calibration and maintenance performed on the pipette 110.

The MicroSD memory card slot 328 located under the battery compartment cover 212 enables the pipette 110 to read and write an optional flash memory card in the MicroSD form factor. A flash memory card may be programmed with firmware updates for the pipette 110, or may store information relating to additional pipetting modes, or selectable parameters for existing modes implemented in the pipette 110. The pipette 110 may further be programmed to store data and operations logs and other records of performance onto a memory card, for subsequent review and analysis on other computing equipment (such as a workstation) also capable of reading the card. Other uses for the MicroSD memory card slot 328 may readily be envisioned.

The USB socket 134 (and a USB cable coupled to an external computing apparatus) may also be used to transfer information to or from the pipette 110, or to update or reprogram the pipette 110. As will be described in further detail below, the USB socket 134 may also serve as a command interface, allowing the pipette 110 to be remotely operated. In an embodiment of the invention, the USB socket 134 may be enabled to serve as a USB device host, allowing the microprocessor to control a peripheral device connected through the USB socket 134, such as a wireless (e.g. WiFi, Bluetooth, ZigBee, or ISM-band) data interface.

Figure 4:
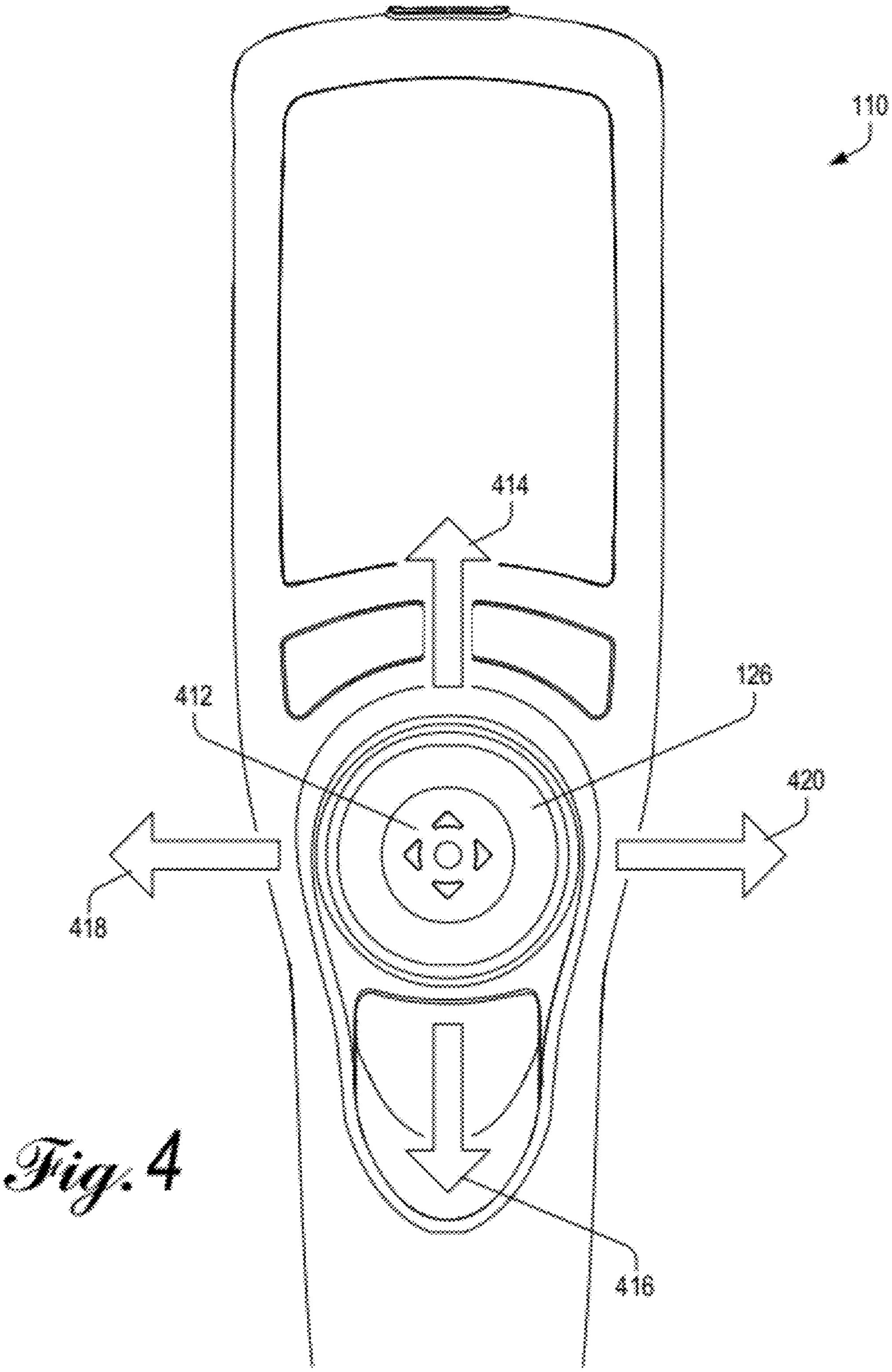
FIG. 4 is an external view of the display and user controls of the electronic pipette of FIG. 1, with arrows indicative of possible movements of a two-axis controller.

FIG. 4 illustrates the controller 126 on a pipette 110 according to the invention, and further documents how the controller 126 may be employed to control the pipette 110.

A nub 412 on a top surface of the controller 126 is contoured and configured to provide a slip-resistant surface for the user's thumb. The user may urge the nub 412, and hence the controller 126, upward in a direction corresponding to a first arrow 414. Similarly, the user may move the nub 412 and controller 126 down, along a second arrow 416, left, along a third arrow 418, or right, along a fourth arrow 420. As will be discussed in further detail below, each of these movements may correspond to a particular action in the user interface of the pipette 110 or a desired pipetting operation.

In an embodiment of the invention, the user may urge the nub 412 in directions other than strict horizontal or vertical movements, with the pipette 110 acting in appropriate response thereto. However, in the disclosed embodiment, the pipette 110 is programmed to respond to primarily horizontal and vertical movements; other (e.g. diagonal) movements are either mapped onto the nearest horizontal or vertical counterpart, or ignored.

As described above, the controller 126 is an analog joystick-style two-axis potentiometer, so the pipette may be programmed to respond to the magnitude of a movement in addition to its direction. This is advantageously employed in connection with a manual pipetting mode, which is described blow in connection with FIG. 14.

As described herein with reference to the illustrated pipette 110, the controller 126 is generally moved either horizontally or vertically to effect a desired result, e.g. an input to the pipette 110 or some control to its operation. It should be noted, however, than an embodiment of the invention may employ directional movements of the controller 126 that are not strictly horizontal or vertical; for example; various diagonal movements or gestures using the controller 126 may have significance. A two-axis joystick-style potentiometer as described herein is well suited for use with such additional directional inputs and gestures.

Figure 5:
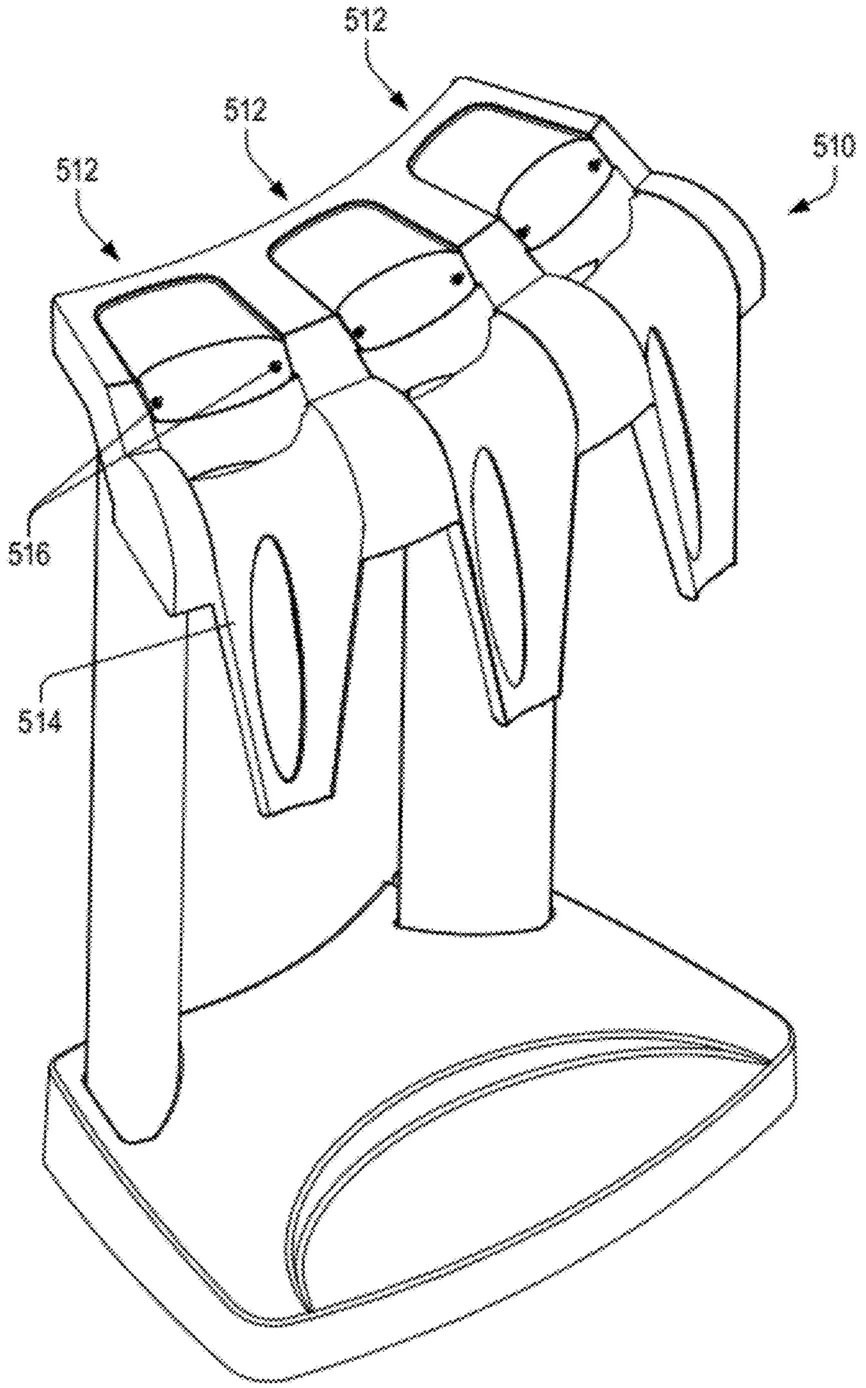
FIG. 5 is an external isometric view of a pipette charge stand, configured to accommodate and charge three electronic pipettes according to the invention.

A charge stand 510 for recharging the battery 316 in one or more pipettes according to the invention is illustrated in FIG. 5. The illustrated charge stand 510 includes three charging locations 512, and hence, can accommodate three pipettes for simultaneous charging.

Each of the charging locations 512 includes a saddle 514, upon which the finger hook 216 of a corresponding pipette 110 (FIG. 1) may rest. The charge stand 510 is configured to snugly hold the pipette 110 in a position that allows two spring-biased electrodes 516 to electrically connect to the corresponding exposed contacts 214 of the pipette 110. An electrical circuit is formed between the electrodes 516 of the charge stand 510 and the contacts 214 of the pipette 110, enabling the battery 316 of the pipette 110 to be charged by power supplied through the charge stand 510, which in turn is connected to some source of electrical power.

Figure 6:
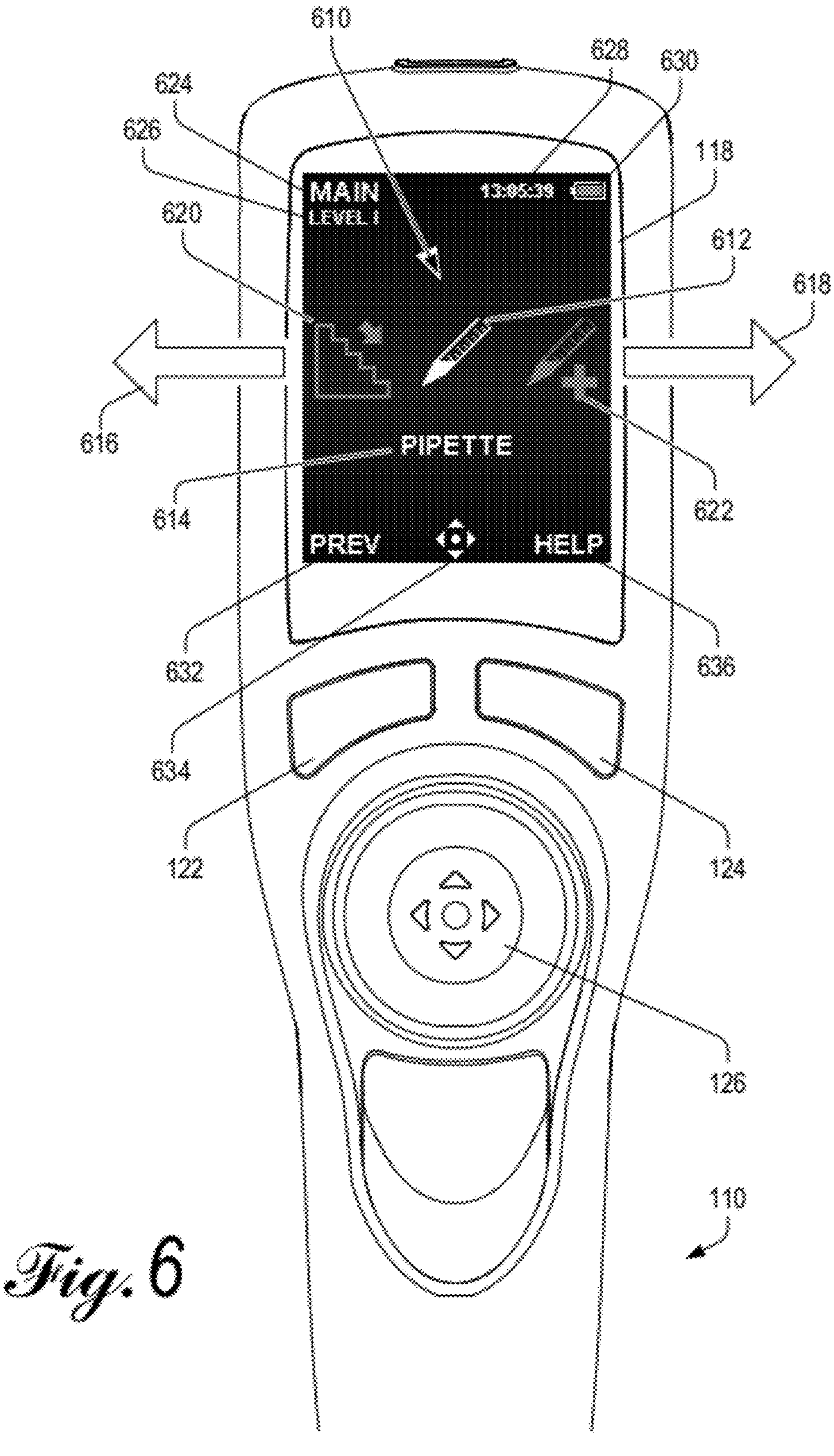
FIG. 6 is an external view of the display and user controls of the electronic pipette of FIG. 1, with the display showing an aspect of the primary high-level user interface of a pipette according to the invention associated with a basic pipetting mode.

Several aspects of the primary user interface of a pipette 110 according to the invention is illustrated in FIG. 6.

The two-axis controller 126 and the control buttons 122-124 are used for navigation. At the highest level of navigation, a carousel 610 of pipette modes is presented in a horizontal orientation near the center of the display 118. As shown in FIG. 6, a basic pipetting mode is selected, as denoted by the icon 612 showing a simple pipette in the center of the display and the corresponding legend 614 ("PIPETTE") under the icon 612.

By moving the controller 126 left (according to a first arrow 616) or right (according to a second arrow 618), the user may select an option either to the left or right of the selected mode. As illustrated, an icon 620 for "LEVEL II" (described with reference to FIG. 21, below) is to the left of the selected icon 612, and the user may select that mode by moving the controller 126 to the left. An icon 622 for "ADVANCED" pipetting mode (described with reference to FIGS. 7-12, below) is to the right of the selected icon 612, and the user may select that mode by moving the controller 126 to the right.

As the controller 126 is moved either left or right, animation is employed to rotate the carousel from mode to mode, visually sliding the appropriate icon into place. This user interface element is deemed a "carousel" because of its essentially circular nature; as the user navigates from left to right or right to left, each mode option is presented in turn, and repeats as necessary without reaching an end.

At the top of the display 118, along the left, text 624 indicates that the "MAIN" (or top-most) level of navigation between modes is in effect, and below that, the "LEVEL I" text 626 indicates that a first carousel of options is being navigated. A mechanism is provided for selecting between two mode carousels: LEVEL I, which includes a few of the most commonly selected modes, and LEVEL II, which includes a wider variety of less commonly used modes. Carousel level selection is discussed in further detail below, with reference to FIGS. 21-22.

Also at the top of the display 118, at the right side, the time of day 628 is shown, along with an icon 630 representing the charge status of the battery 316. A full green bar represents a full battery, while smaller green bars or yellow or red bars may represent successive levels of battery depletion.

Along the bottom of the display 118 are a first legend 632 for the left button 122, a navigational compass icon 634 for directional guidance, and a second legend 636 for the right button 124.

The first legend 632 "PREV" indicates that the most recently accessed mode (i.e., the previous mode) of pipette operation may be accessed by depressing the left button 122. For example, if the user was most recently using the basic pipetting mode, then exited to the main carousel, the user may again access the basic pipetting mode by pressing the button corresponding to the "PREV" legend.

The second legend 636 "HELP" indicates that a textual help screen may be accessed by depressing the right button 124. The pipette 110 advantageously provides multiple individually accessible and scrollable screens of documentation to facilitate ease of use. These various help screens are generally accessible from all of the modes of operation provided by a pipette 110 according to the invention.

The navigational compass icon 634, at the center of the bottom of the display 118, provides the user with guidance on what navigational actions are allowable through the controller 126. As illustrated in FIG. 6, all four directional arrows and a central dot are illuminated in the navigational compass icon, indicating that the controller may be moved in any of the four directions (corresponding to the arrows) or depressed (corresponding to the dot). Moving the controller 126 left or right will move the carousel, as described above, and moving the controller up or down, or depressing it, will select the presently highlighted mode option.

Starting from the condition illustrated in FIG. 6, namely at the MAIN navigational carousel, LEVEL I, if the user pushes the controller to the right (corresponding to the second arrow 618), the ADVANCED mode will be selected. An audio cue may be generated to indicate the change, and the user interface changes to what is illustrated in FIG. 7.

As in FIG. 6, the MAIN navigational carousel and LEVEL I are still selected, but an icon 622 corresponding to the ADVANCED mode is in the center of the display and highlighted, and the basic PIPETTE mode is no longer selected, with its corresponding icon 612 to the left. An icon 712 for a multidispense ("MULTI-DISP") mode is to the right. The user may select the ADVANCED mode of operation by moving the controller 126 up, down, or depressing it, or may continue to navigate left or right through the carousel.

When navigating in the carousel 610, the user may move one mode at a time from left to right, or from right to left, by pushing the controller 126 right or left, respectively, and releasing it. Alternatively, the user may scroll more rapidly through the available modes in the carousel 610 by holding the controller in either direction without releasing it.

Figure 7:
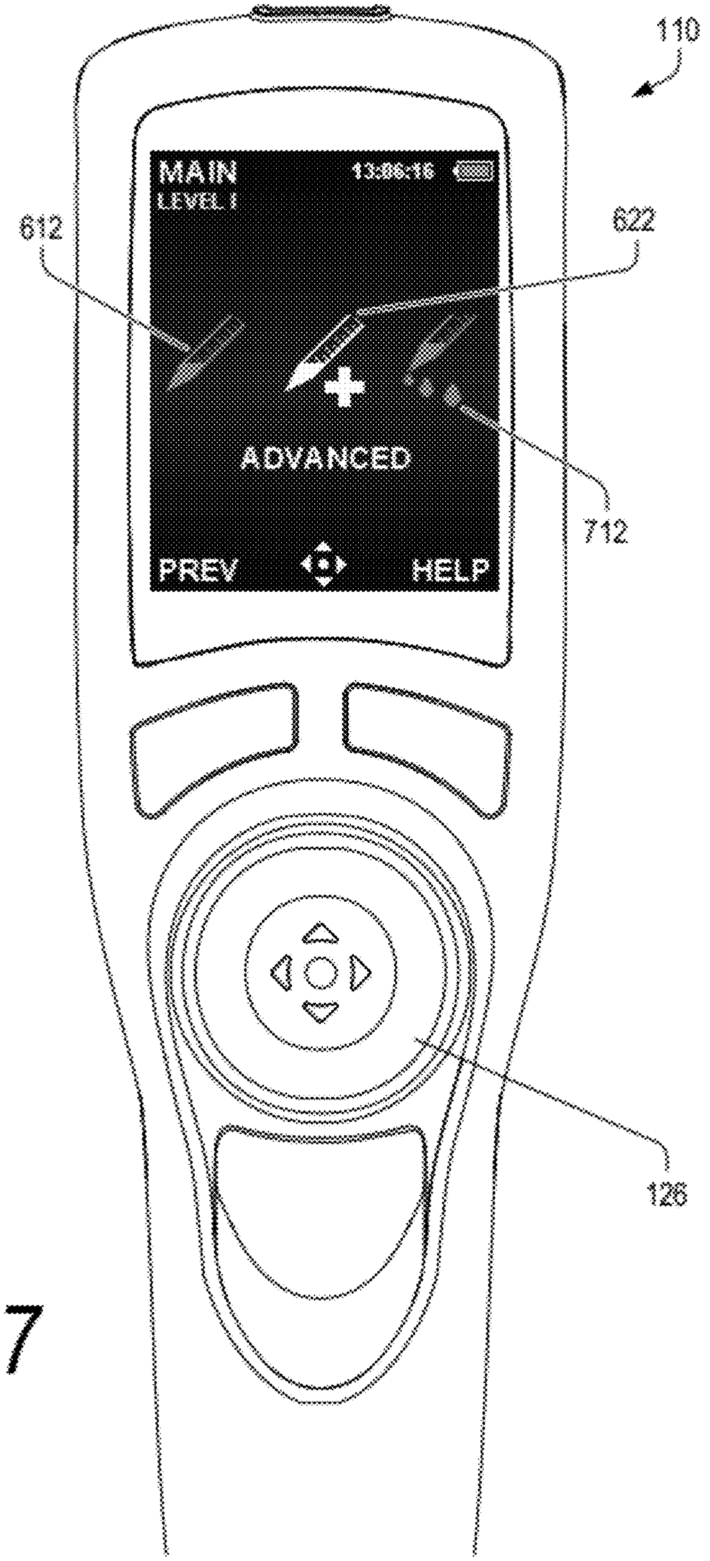
FIG. 7 is an external view of the display and user controls of the electronic pipette of FIG. 1, with the display showing an aspect of the primary high-level user interface of a pipette according to the invention associated with an advanced pipetting mode.
Figure 8:
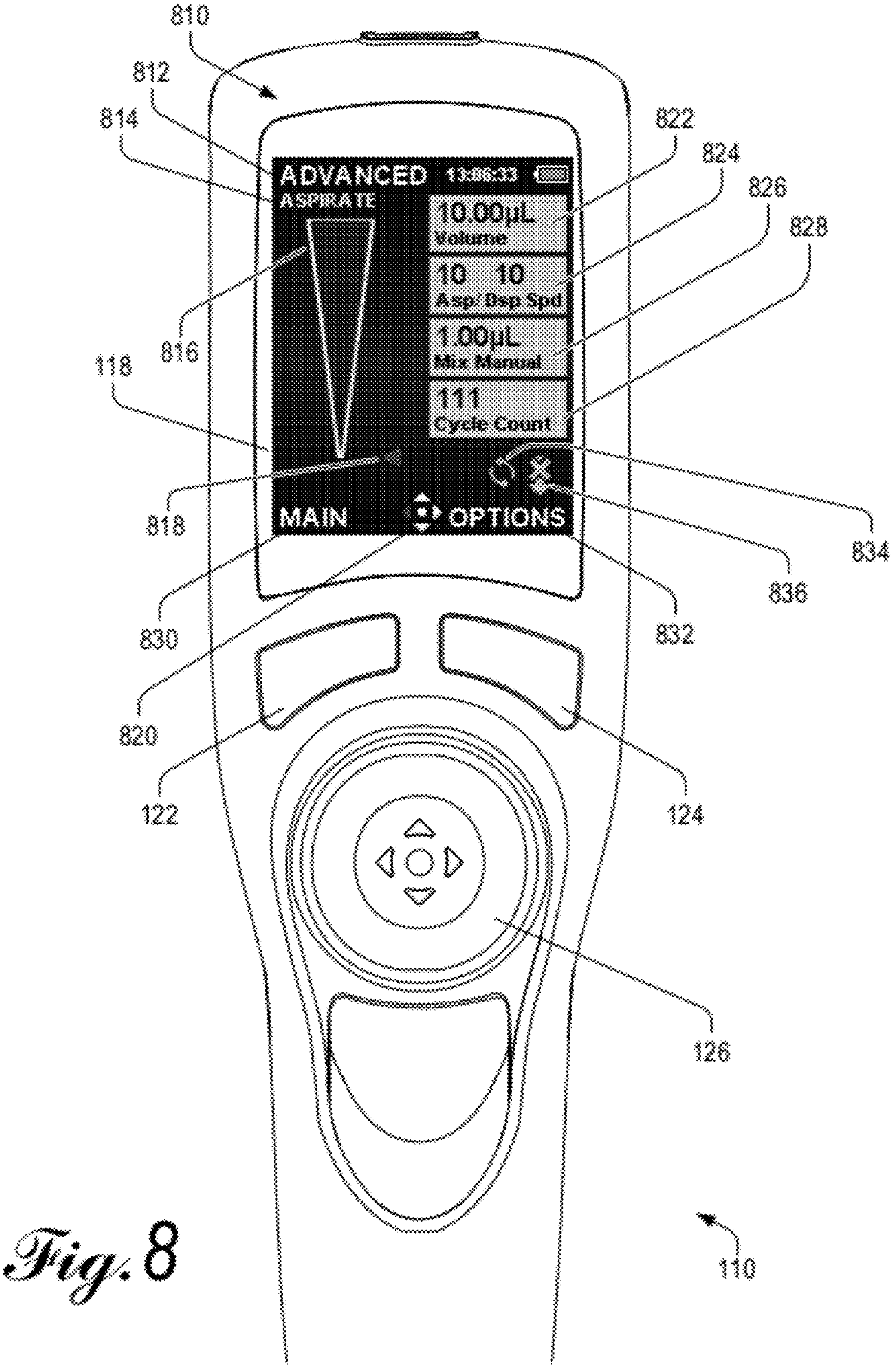
FIG. 8 is an external view of the display and user controls of the electronic pipette of FIG. 1, with the display showing an aspect of the detailed user interface of a pipette according to the invention associated with the advanced pipetting mode.

Referring now to FIG. 8, once the ADVANCED pipetting mode has been selected as indicated above, with reference to FIG. 7, the user is presented with a user interface screen 810 similar to that illustrated in FIG. 8.

In the upper left portion of the display 118, text 812 indicates that the user is in ADVANCED MODE, and below that, additional text 814 indicates that the tip is ready to ASPIRATE, or take up fluid.

A graphical depiction of a pipette tip 816 is presented, visibly empty (as should also be the actual pipette tip attached to the pipette 110), and a caret 818 as a visual aid representing the liquid level is aligned to the bottom of the pipette tip 816. At this point, the pipette 110 is ready to begin pipetting operations in ADVANCED mode.

By manipulating the controller 126 up and down, the user may operate the pipette 110. From the illustrated state, the user may push the controller 126 in an upward direction or depress it to activate aspiration and take up fluid. As noted on the display 118, the pipette 110 has a volume setting of 10.00 μl, so the piston 334 of the pipette 110 will be driven appropriately to ensure that the desired quantity of fluid will be aspirated. As that occurs, the graphical depiction of a pipette tip 816 will show a rising liquid level, ending at the level corresponding to 10 μl. The caret 818 will also move to that level.

Following aspiration, the user may push the controller 126 in a downward direction or depress it to dispense the liquid, which may be followed by an optional blowout stroke, as is traditional in pipetting, to ensure all liquid is expelled from the tip. The graphical pipette tip 816 and caret 818 are animated to illustrate the dispensing operation.

It will be noted that a navigational compass icon 820 on the ADVANCED screen 810 of FIG. 8 has only the upward, downward, and right-pointing arrows illuminated, along with the central dot. Moving the controller 126 upward or depressing it will initiate aspiration as discussed above; moving it downward will cause a blowout stroke to occur, to expel any undesired liquid that might be in the tip; and moving it to the right will allow the mode options 822-828 to be accessed and changed, if desired. No action is defined for moving the controller 126 to the left, which is indicated by leaving the navigational compass icon 820 left-pointing arrow unilluminated, or dimmed.

A first text legend 830 corresponding to the left button 122 reads "MAIN," and depressing that button will return the pipette 110 to the main high-level navigational carousel 610, discussed above with reference to FIG. 6. A second text legend 832 corresponding to the right button 124 reads "OPTIONS," and depressing that button will access additional option settings related to the ADVANCED pipetting mode, which will be discussed with reference to FIGS. 9-10 below.

By moving the controller 126 to the right from the condition illustrated in FIG. 8, the user may access the primary options relating to the ADVANCED pipetting mode, namely the volume setting 822, the cycle (aspirate and dispense) speeds 824, mixing settings 826, and the cycle counter 828. After moving the controller 126 to the right, the volume setting will be highlighted, and may be selected for adjustment by depressing the controller 126 or moving it right again. Alternatively, the user may navigate to other settings by moving the controller 126 up or down.

When a parameter setting is selected, it may be adjusted directly (if it is a single numerical value, such as a single volume setting or the cycle counter) by moving the controller 126 up and down to adjust the value up or down by a single digit interval. Larger, coarser adjustments may be made by moving the controller 126 left or right. When finished, the user depresses the controller 126 (or depresses a control key 122-124 labeled with a "DONE" legend) to return to navigation.

In the disclosed embodiment, increments and decrements to parameter settings are performed incrementally, one desired interval (small or large) at a time, per movement and release of the controller 126. For example, to increment the volume setting by two intervals, the user would momentarily move the controller 126 up twice. If the controller 126 is held in a desired direction for more than a defined period of time, the value may continue to increment or decrement automatically, scrolling through its possible range of values as the controller is held. The pipette 110 may be programmed to either roll-over between maximum and minimum volume settings when the end of a parameter range is reached, or not.

When a setting includes multiple subsettings (such as multiple volumes in sequence, or cycle speeds) a submenu is accessed for adjustment. This mode of setting adjustment will be discussed with reference to FIGS. 11-12, below.

The ADVANCED pipetting mode illustrated in FIG. 8, and other operating modes of a pipette 110 according to the invention, may also have certain status icons present on the mode screen 812. As shown in FIG. 8, a first status icon 834 indicates that mixing mode is activated, and a second status icon 836 indicates that the blowout stroke is inhibited.

Figure 9:
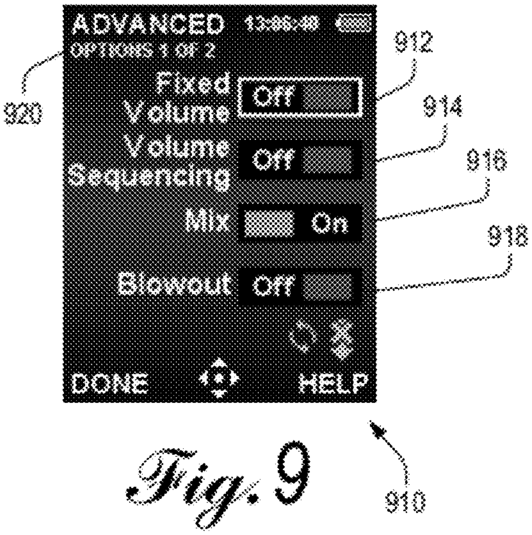
FIG. 9 is a representation of a display on an electronic pipette according to the invention showing a first option setting screen associated with the advanced pipetting mode.
Figure 10:
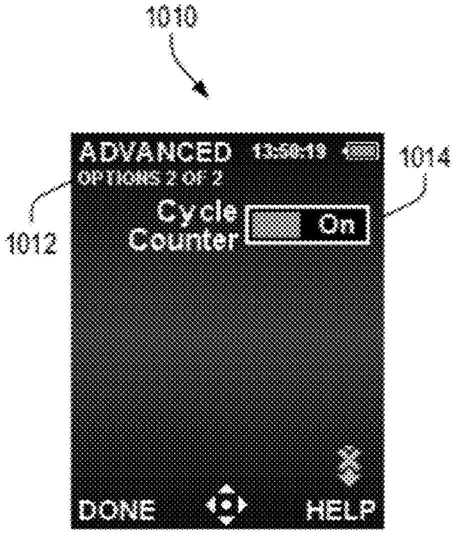
FIG. 10 is a representation of a display on an electronic pipette according to the invention showing a second option setting screen associated with the advanced pipetting mode.

FIG. 9 depicts an exemplary option-setting screen 910 accessed by actuating the button 124 corresponding to the "OPTIONS" legend 832 in FIG. 8.

ADVANCED pipetting mode has numerous Boolean options accessible in this manner, including whether fixed or variable volumes are settable 912; whether volume sequencing (automatically varying the volume setting from cycle to cycle) is activated 914; whether mixing is enabled 916; or whether the blowout stroke is enabled or inhibited 918. These parameters are accessed and changed generally as described above for the primary options, by moving the controller 126 until the desired setting is highlighted, then depressing the controller 126 (or moving it right) to select the setting, manipulating the controller to change the desired value, then selecting the "DONE" button or depressing the controller 126 again to return to navigation mode.

There are more options in the ADVANCED pipetting mode than can be presented on the screen 910 of FIG. 9, and accordingly, when the user navigates downward from the blowout option 918 in FIG. 9, a second option-setting screen 1010 becomes visible. To distinguish between the two option-setting screens 910 and 1010, the first screen 910 is labeled as "OPTIONS 1 of 2" 920 and the second screen 1010 is labeled "OPTIONS 2 of 2" 1012. In connection with the ADVANCED pipetting mode, the second option-setting screen 1010 includes an option determining whether the cycle counter is active 1014.

Figure 11:
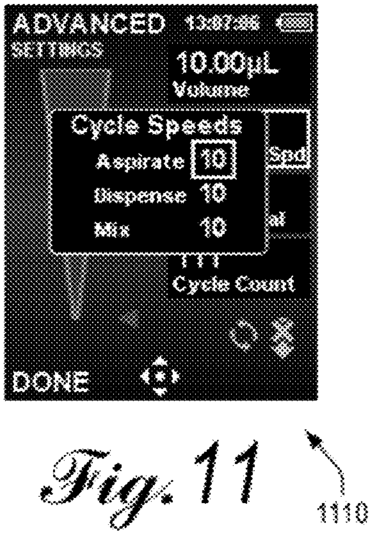
FIG. 11 is a representation of a display on an electronic pipette according to the invention showing a cycle speed setting screen associated with the advanced pipetting mode.

When accessing the cycle speed option 824 in the ADVANCED pipetting mode screen 810 of FIG. 8, a cycle speed menu 1110 appears as shown in FIG. 11 to allow individual settings for aspiration, dispensing, and mixing modes. Navigation between the separate subsettings and adjustment thereof are accomplished as set forth above, for navigating and adjusting other parameters in a pipette according to the invention.

Figure 12:
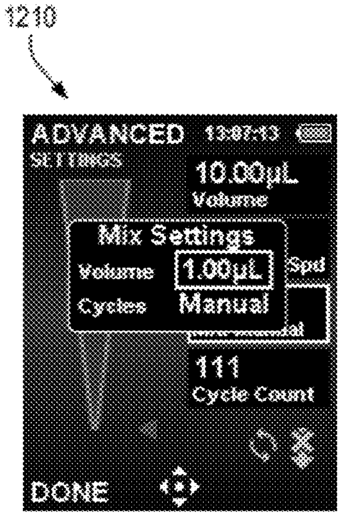
FIG. 12 is a representation of a display on an electronic pipette according to the invention showing a mix settings screen associated with the advanced pipetting mode.

Mixing settings 826, accessed from the ADVANCED pipetting mode screen 810 of FIG. 8, provides a mix settings menu 1210 as shown in FIG. 12. From this menu, the user may change the mix voume and the number of mix cycles to be performed (or manual mixing). Navigation and parameter adjustment in the mix settings menu 1210 is as described above.

Figure 13:
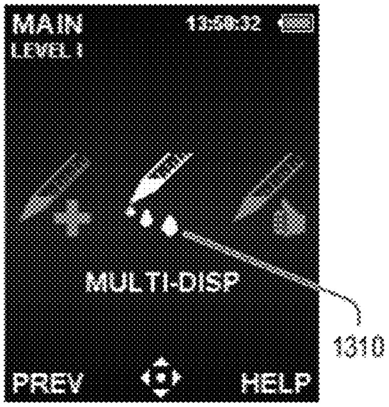
FIG. 13 is a representation of a display on an electronic pipette according to the invention showing an aspect of the primary high-level user interface of a pipette according to the invention associated with a multi-dispense pipetting mode.

Returning to the main carousel user interface initially described with reference to FIG. 6, a multidispensing (MULTI-DISP) mode and corresponding icon 1310 are illustrated in FIG. 13. In multidispense mode, a single relatively large aspiration volume is obtained and dispensed in multiple smaller aliquots. Appropriate parameters and options are available and accessible when MULTI-DISP mode is selected.

Figure 14:
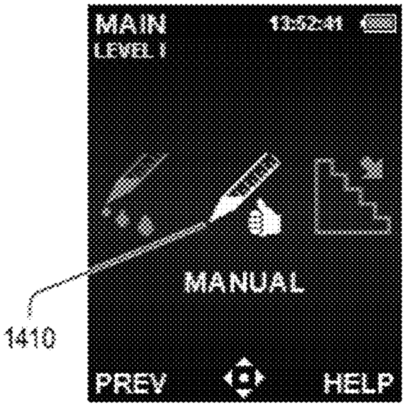
FIG. 14 is a representation of a display on an electronic pipette according to the invention showing an aspect of the primary high-level user interface of a pipette according to the invention associated with a manual pipetting mode.

In FIG. 14, a MANUAL pipetting mode and corresponding icon 1410 are illustrated. In MANUAL mode, the pipette 110 may be controlled by the user to gradually and selectively aspirate and dispense liquid by moving the controller 126 up and down, as desired. Moving the controller 126 up a small amount will result in slow aspiration, for as long as the controller 126 is held in position, up to a selectable maximum volume setting. Moving the controller 126 up a larger distance will result in faster aspiration, up to a selectable maximum piston speed.

Similarly, moving the controller 126 down a small amount will result in slow dispensing, for as long as the controller 126 is held in position, until all liquid has been dispensed. Moving the controller 126 down a larger distance will result in faster aspiration, up to a selectable maximum piston speed. If the controller 126 is moved down after dispensing all liquid, a blowout stroke will be performed by the pipette 110.

In MANUAL pipetting mode, there are no separate aspiration or dispense strokes; the user is in full control of the piston 334 by moving the controller 126 up and down. It has been found that the method of using the controller 126 described herein, in which the position of the controller 126 along a vertical axis controls the speed at which aspiration takes place, is a convenient, intuitive, and useful control method for handling and measuring small but potentially unknown quantities of liquid. In the disclosed embodiment of the invention, the relationship between the position of the controller 126 and the speed of aspiration or dispensing is not linear; rather, it resembles an exponential curve. Accordingly, piston movement is slow and easy to control in a band around the central position of the controller 126, and only reaches high speeds near the extremes of the travel of the controller 126. The relationship between controller position and piston speed may be defined by a transfer function, which may be either smooth and continuous or a discontinuous stepwise function separated into discrete zones (e.g., a few discrete slow speeds near the center of the controller, and one or more higher speeds in a zone near the edge of the controller's movement). A look-up table may advantageously be employed in the firmware of the pipette 110 to define the response characteristics of the controller 126 in a MANUAL pipetting mode or in similar modes.

In the disclosed embodiment of the invention, the travel of the controller 126 is divided into a plurality of substantially evenly spaced speed zones, but the speed zones map to piston speeds that increase in a non-linear fashion from the central zones to the outer zones. The central zones are all relatively slow, allowing fine control over the movement of the piston 334. Zones closer to the edge of the controller's travel increase in speed more rapidly, allowing rapid piston movement when desired.

The speed of the piston 334 may be varied in a MANUAL pipetting mode based on factors other than the position of the controller 126. For example, the piston speed may also be dependent on the maximum volume setting of the pipette; the current piston position in relation to the maximum volume setting or the home (empty) position; the size of the pipette tip in use (generally related to the particular pipette upon which the tip is mounted); or how long the controller 126 is being held in a particular position (following a programmed acceleration or deceleration profile to reach and match a speed corresponding to the controller position).

Other methods of controlling a pipette 110 in a manual mode may be envisioned, including a servo-type mode in which the position of the controller 126 is mapped to a desired position of the piston 334, rather than its speed, but this has been found to be more difficult to control.

In the disclosed embodiment of the invention, the MANUAL pipetting mode includes a stepping function to selectively aspirate or dispense liquid in a stepwise fashion, one small increment at a time. One of the control buttons 122-124 may be labeled with a legend such as "STEP UP" or "STEP DOWN" during manual mode. In the pipette 110 described herein, moving the controller 126 upward to aspirate in MANUAL pipetting mode causes one of the buttons 122-124 to be labeled with "STEP UP," and by returning the controller 126 to its spring-biased center position, and repeatedly pressing the labeled button, the user may repeatedly cause the piston to move, one step at a time at the smallest selectable interval, in the same upward direction. Similarly, once the user starts moving the controller 126 downward to dispense, the button is relabeled with "STEP DOWN," and subsequent button presses will cause the piston to move, one step at a time at the smallest selectable interval, in the same downward direction. This stepping capability allows the MANUAL pipetting mode to aspirate and dispense fluids with great accuracy. For additional speed, the pipette 110 may automatically repeat the step-based dispensing operation one or more additional times when the button is held down for longer than a specified time.

Figure 15:
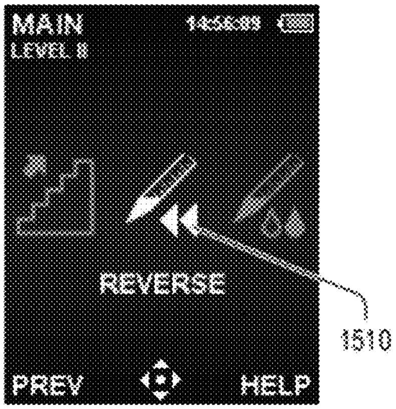
FIG. 15 is a representation of a display on an electronic pipette according to the invention showing an aspect of the primary high-level user interface of a pipette according to the invention associated with a reverse pipetting mode.

FIG. 15 illustrates the existence of and icon 1510 for a REVERSE pipetting mode, in which more than a desired quantity of fluid is taken in during an aspiration stroke (the desired amount plus a fixed blowout volume), then dispensed as desired, with the blowout quantity discarded. Reverse pipetting modes are well known and usable in commercially available electronic pipettes; appropriate option settings are available upon selection of REVERSE pipetting mode.

Figure 16:
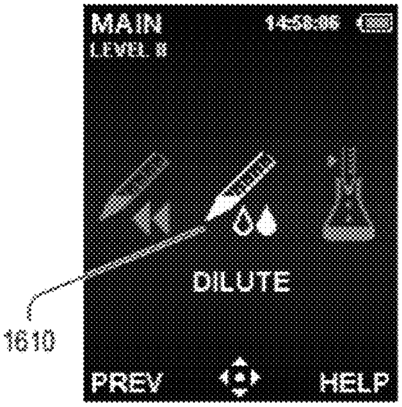
FIG. 16 is a representation of a display on an electronic pipette according to the invention showing an aspect of the primary high-level user interface of a pipette according to the invention associated with a dilution pipetting mode.

FIG. 16 illustrates the carousel position and icon 1610 for a dilution (DILUTE) pipetting mode. In DILUTE mode, the pipette 110 provides in-tip dilution of multiple sample volumes, by aspirating multiple liquid samples, optionally separated by air gaps. The multiple samples are then dispensed in a single dispense stroke. Appropriate option settings are provided for the operation of DILUTE mode.

Figure 17:
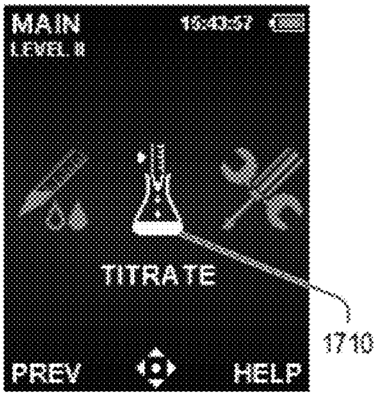
FIG. 17 is a representation of a display on an electronic pipette according to the invention showing an aspect of the primary high-level user interface of a pipette according to the invention associated with a titration pipetting mode.

As illustrated in FIG. 17, at TITRATE mode and icon 1710 are available, in which the pipette 110 performs titration through measured dispensing. A user can set an initial rapid dispense volume, followed by a precisely controlled manual dispense of the remaining titration volume. As in the MANUAL mode (FIG. 14), the manual dispense portion of a titration cycle may be modulated by the user manipulating the controller 126, pushing it downward a small amount for slow dispensing, or a relatively larger distance for faster dispensing. As with all other operating modes of the pipette 110, appropriate options and settings are available for the TITRATE mode.

As with the MANUAL pipetting mode described above with reference to FIG. 14, the TITRATE mode also preferably includes a button-controlled STEP DOWN operation for precise, accurate control of the quantity of fluid dispensed.

Figure 18:
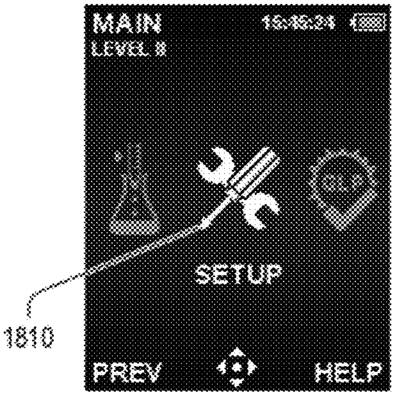
FIG. 18 is a representation of a display on an electronic pipette according to the invention showing an aspect of the primary high-level user interface of a pipette according to the invention associated with a setup mode.

In FIG. 18, a SETUP mode and icon 1810 are illustrated. No pipetting is performed in SETUP mode; rather, system-level options are set, such as the display brightness, sound volume, display timeout period, sleep timer (for the period of inactivity before low-power sleep mode is activated), time and date, language, and other display format settings. The various options and parameters in SETUP mode are accessed and altered as described above in connection with other pipetting modes described herein.

In SETUP mode, the user may also set service-related intervals, such as the number of cycles or days that may elapse before a service reminder warning is issued.

Figure 19:
FIG. 19 is a representation of a display on an electronic pipette according to the invention showing an aspect of the primary high-level user interface of a pipette according to the invention associated with a GLP parameter-setting mode.

A Service (GLP) mode is available, and its icon 1910 is illustrated in FIG. 19. In the service mode, the user may view detailed technical information about the pipette 110, including its serial number, manufacture date, model number, and current firmware version. The user may also view operational logs, including details on the number of days since the pipette 110 was last serviced, and the number of pipetting cycles performed since the last service or over the lifetime of the pipette. Data may be stored for multiple previous service intervals.

It should be noted that although the RFID tag 344 may also store service-related information, the data presented in service mode is not obtained from the tag 344, but rather from memory internal to the pipette 110 and connected to its microprocessor. Accordingly, information obtained in service mode and information obtained by reading the RFID tag 344 need not necessarily correspond; the RFID tag 344 is provided primarily for convenient tracking when desirable, and need not be used.

Figure 20:
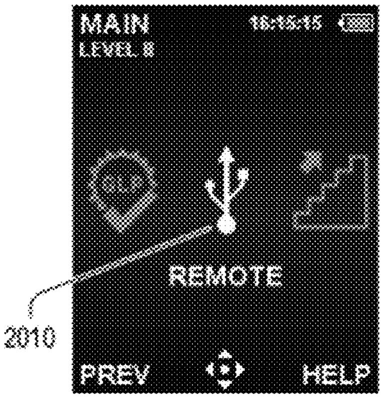
FIG. 20 is a representation of a display on an electronic pipette according to the invention showing an aspect of the primary high-level user interface of a pipette according to the invention associated with a remote-control mode used to update the firmware of the pipette.

In a REMOTE mode illustrated in FIG. 20, having an icon 2010, the pipette 110 may be connected via the USB socket 134 to an external workstation to update the firmware of the pipette 110. Utilization of the REMOTE mode may require certain software to be installed and operated on the workstation.

In various embodiments of the invention, the REMOTE mode and similar modes may also be used to control the pipette 110 in real time, by using a workstation or other USB-enabled apparatus to transmit commands to the pipette 110 over the USB interface, and to optionally receive data (including confirmations and acknowledgements) in response. Additional uses of a REMOTE mode and a data interface on a pipette 110 may also, of course, be envisioned.

Figure 21:
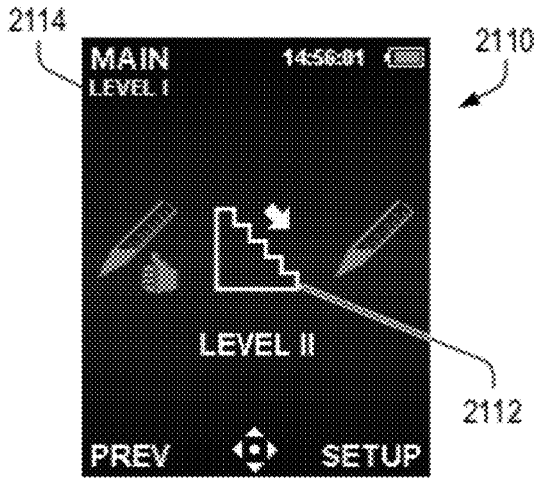
FIG. 21 is a representation of a display on an electronic pipette according to the invention showing an aspect of the primary high-level user interface of a pipette according to the invention associated with switching from a first selection of pipetting and other modes to a second selection.
Figure 22:
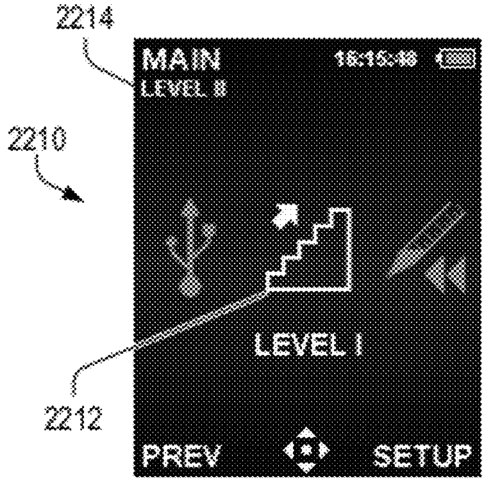
FIG. 22 is a representation of a display on an electronic pipette according to the invention showing an aspect of the primary high-level user interface of a pipette according to the invention associated with switching back from the second selection of pipetting and other modes to the first selection.

As noted above with reference to FIG. 6, there are two carousel levels in the main high-level user interface of a pipette 110 according to the invention. As shown in FIG. 21, an icon 2112 is available to transition the carousel from a primary LEVEL I of the carousel, in which the most frequently accessed modes are available, to a secondary LEVEL II of the carousel with less frequently used modes. Upon selection of this icon (and activation by depressing the controller 126 or moving it up or down), the switch to LEVEL II is performed. The carousel screen 2110 of FIG. 21 includes an indication 2114 that LEVEL I is the currently operative portion of the carousel.

By default, the basic PIPETTE mode, ADVANCED mode, MULTI-DISP mode, and MANUAL mode are in the primary LEVEL I of the carousel, and REVERSE mode, DILUTE mode, TITRATE mode, SETUP mode, and GLP service mode, and REMOTE mode are in the secondary LEVEL II of the carousel. These default positions are considered to place the most frequently used modes in LEVEL I, and less frequently used (or specialized) modes in LEVEL II. If a particular user's needs deviate from the defaults, each mode may be moved between LEVEL I and LEVEL II by accessing and changing appropriate settings in the SETUP mode described above.

In LEVEL II of the carousel, an icon 2212 is presented to allow the user to return to LEVEL I of the carousel when selected. This item in the carousel is always present in LEVEL II, and may not be relocated. An indication 2214 is present on the screen 2210 corresponding to the LEVEL II carousel that LEVEL II is in effect.

It should be observed that while the foregoing detailed description of various embodiments of the present invention is set forth in some detail, the invention is not limited to those details and a pipette made according to the invention can differ from the disclosed embodiments in numerous ways. In particular, it will be appreciated that embodiments of the present invention may be employed in many different fluid-handling applications. It should be noted that functional distinctions are made above for purposes of explanation and clarity; structural distinctions in a system or method according to the invention may not be drawn along the same boundaries. Hence, the appropriate scope hereof is deemed to be in accordance with the claims as set forth below.

What is claimed is:

1. A handheld electronic pipette, comprising:

a linear actuator, including a motor for driving a piston to aspirate and dispense fluid into and from a pipette tip;

a control circuit for the pipette including a user controllable microprocessor and memory;

a display electrically connected to the microprocessor; and a user operable controller connected to the microprocessor;

wherein the microprocessor is programmed to present a plurality of selectable modes of operation on a user interface to a user on the display, and to control the motor in response to a programmed sequence or instructions from the user;

wherein one of the selectable modes of operation comprises a mode in which the piston is driven in response to a position of the controller during a pipetting operation; wherein the microprocessor is programmed to control the motor to aspirate or dispense liquid into or from the pipette tip in response to a movement of the controller; and the microprocessor is further programmed to control a speed of the aspiration or dispensing or a position of the piston during the pipetting operation at least in part by a magnitude of the user's actuation of the controller from a home position; and wherein the controller is further operable by the user to navigate and select at least one option in the user interface.

2. The pipette of claim 1, wherein the display comprises a backlit color dot-matrix LCD.

3. The pipette of claim 2, wherein the user interface comprises a graphical user interface.

4. The pipette of claim 1, wherein the controller is configured to receive a user input representative of a position along two axes.

5. The pipette of claim 4, wherein the controller comprises a two-axis controller.

6. The pipette of claim 5, wherein the two-axis controller includes a plurality of potentiometers.

7. The pipette of claim 5, wherein the two-axis controller further comprises a momentary switch actuated by depressing the controller.

8. The pipette of claim 1, further comprising at least one user operable multifunctional button coupled to the microprocessor.

9. The pipette of claim 1, wherein the user interface comprises a graphical user interface, and wherein the microprocessor is further programmed to cause the pipette to display a plurality of icons corresponding to and representing the modes of operation in response to manipulation of the controller, and to enter a user-selected mode of operation upon a specific user actuation of the controller or a button.

10. The pipette of claim 9, wherein the plurality of icons is arranged in at least one visual carousel of modes of operation.

11. The pipette of claim 10, wherein a first carousel includes a plurality of primary modes of operation, a second carousel includes a plurality of secondary modes of operation, a first icon in the first carousel selects the second carousel for use, and a second icon in the second carousel selects the first carousel for use.

12. The pipette of claim 1, wherein aspiration is performed when the controller is manipulated in a first direction along a first axis from the home position, and wherein dispensing is performed when the controller is manipulated in a second direction along the first axis from the home position.

13. The pipette of claim 1, wherein the mode in which the piston is driven in response to a position of the controller comprises a manual pipetting mode.

14. The pipette of claim 1, wherein the first axis comprises a vertical axis.

15. The pipette of claim 1, wherein the controller is spring-biased to the home position.

16. The pipette of claim 1, wherein the home position comprises a center position of the controller.

17. The pipette of claim 1, wherein the controller is a two-axis controller.

18. The pipette of claim 1, wherein the selected speed of aspiration or dispensing is related to the magnitude of the user's actuation of the controller via transfer function.

19. The pipette of claim 18, wherein the transfer function specifies a non-linear relationship.

20. The pipette of claim 19, wherein the transfer function specifies an exponential relationship.

21. The pipette of claim 18, wherein the transfer function specifies a discontinuous stepwise function.

22. The pipette of claim 18, wherein the selected speed of aspiration or dispensing is further related to at least one of: a maximum speed setting, a maximum volume setting of the pipette; a piston position in relation to the maximum volume setting; a piston position in relation to a home position; and a volume of the pipette tip attached to the pipette.

23. The pipette of claim 18, wherein the motor is accelerated or decelerated via a programmed profile to match the selected speed of aspiration or dispensing.

24. The pipette of claim 1, wherein the microprocessor is further programmed to control the motor in a stepwise fashion to aspirate or dispense liquid into or from the pipette tip in individual programmed increments, in response to a selective depression of a button.

25. The pipette of claim 24, wherein the microprocessor is further programmed to repeat the stepwise control of the motor while the button is held.

26. The pipette of claim 1, wherein the controller is operable to change a value of at least one parameter associated with an operation of the pipette.

27. The pipette of claim 26, wherein the parameter is adjusted by a first interval through user manipulation of the controller along the at least one axis.

28. The pipette of claim 27, wherein the controller comprises a two-axis controller, and wherein the parameter is adjusted by a second interval through user manipulation of the controller along a second axis.

* * * * *